US012744299B2

(12) United States Patent
Singh et al.

(10) Patent No.: US 12,744,299 B2
(45) Date of Patent: Sep. 22, 2026

(54) MILLIMETER-WAVE CROSSOVER COUPLER

(71) Applicant: Dell Products L.P., Round Rock, TX (US)

(72) Inventors: Tejinder Singh, Manotick (CA); Navjot Kaur Khaira, Manotick (CA)

(73) Assignee: Dell Products L.P., Round Rock, TX (US)

( * ) Notice: Subject to any disclaimer, the term of this patent is extended or adjusted under 35 U.S.C. 154(b) by 175 days.

(21) Appl. No.: 18/750,732

(22) Filed: Jun. 21, 2024

(65) Prior Publication Data

US 2025/0392029 A1 Dec. 25, 2025

(51) Int. Cl.
*H01P 5/18* (2006.01)
*G06F 30/392* (2020.01)
(Continued)

(52) U.S. Cl.
CPC ............ *H01P 5/184* (2013.01); *G06F 30/392* (2020.01); *H01P 5/028* (2013.01); *G06F 2119/06* (2020.01)

(58) Field of Classification Search
CPC ...... H01P 5/02; H01P 5/08; H01P 5/12; H01P 5/18; H01P 5/184; H01P 5/19
See application file for complete search history.

(56) References Cited

U.S. PATENT DOCUMENTS 4,525,690 A * 6/1985 De Ronde ............... H01P 5/227 333/116
5,237,294 A 8/1993 Roederer et al.
(Continued)

FOREIGN PATENT DOCUMENTS

CN 106025476 A * 10/2016 .............. H01P 5/184
CN 106602199 B * 5/2019 ................ H01P 5/16

OTHER PUBLICATIONS

Fairclough, Caty, "Designing a Butler Matrix Beamforming Network with RF, Modeling", COMSOL Multiphysics, Online available at URL: https://www.comsol.com/blogs/designing-a-butler-matrix-beamforming-network-with-rf-modeling, Jun. 27, 2017, 11 pages.

(Continued)

*Primary Examiner* — Andrea Lindgren Baltzell
*Assistant Examiner* — Alan Wong
(74) *Attorney, Agent, or Firm* — Amin, Turocy & Watson, LLP

(57) ABSTRACT

The technology described herein is directed towards a wide-bandwidth, high-frequency (e.g., millimeter wave) crossover coupler. One implementation of the crossover coupler is designed with a single top metallization layer, is passive, and does not require any interconnecting layer. The design can include cross-shaped apertures enclosed by four metallic inner and outer partial patches, which effectively direct the electromagnetic fields to the crossover circuit's ports. Straightforward design tweaks can change the radio frequency (RF) characteristics of the crossover coupler, including, for example, selecting various design dimensions that determine the center frequency, bandwidth, coupling strength, and/or characteristic impedance of the crossover coupler, and can account for substrate permittivity and the height of the substrate. A cutout in a ground plane beneath the substrate can be sized to mitigate RF mismatch.

20 Claims, 10 Drawing Sheets

(51) Int. Cl.
*H01P 5/02* (2006.01)
*G06F 119/06* (2020.01)

(56) References Cited

U.S. PATENT DOCUMENTS

| | | | | |
|---|---|---|---|---|
| 5,889,449 | A | 3/1999 | Fiedziuszko | |
| 7,161,444 | B2 * | 1/2007 | Saitoh | H01P 5/16 333/120 |
| 7,319,370 | B2 * | 1/2008 | Napijalo | H01P 5/185 333/116 |
| 8,432,235 | B2 * | 4/2013 | Yoshioka | H01P 5/12 333/24 R |
| 9,391,353 | B2 * | 7/2016 | Nagai | H01P 5/028 |
| 2011/0309894 | A1 | 12/2011 | Kuo et al. | |
| 2026/0005419 | A1 * | 1/2026 | Singh | H01P 5/184 |
| 2026/0045674 | A1 * | 2/2026 | Singh | H01P 5/02 |
| 2026/0045689 | A1 * | 2/2026 | Singh | H01Q 3/38 |

OTHER PUBLICATIONS

Wikipedia, "Butler Matrix", Online available at URL: https://en.wikipedia.org/wiki/Butler_matrix#cite_note-25, retrieved on Jan. 13, 2025, 4 pages.
Prakash et al., "Design of a 4×4 Butler Matrix and Its Process Modeling Using Petri Nets for Phase Array Systems", Progress in Electromagnetic Research C, vol. 103, 2020, pp. 137-153.
Singh et al., "Miniaturized DC-60 GHz RF PCM GeTe-Based Monolithically Integrated Redundancy Switch Matrix Using T-Type Switching Unit Cells", IEEE Transactions on Microwave Theory and Techniques, vol. 67, No. 12, Dec. 2019, pp. 5181-5190.
Messem et al., "A 4×4 Millimeterwave-Frequency Butler Matrix in Grounded Co-Planar Waveguide Technology for Compact Integration with 5G Antenna Arrays", IEEE Transactions on Microwave Theory and Techniques, vol. 71, No. 1, 2023, 13 pages.
MathsWorks, "Matlab for Intelligence Design AI Models and AI-driven Systems", Online available at URL: https://in.mathworks.com/, retrieved on Jan. 13, 2025, 5 pages.
Krytar, "3 dB 180 Degree Hybrid Couplers", Online available at URL: https://krytar.com/product/hybrid-couplers/3-db-180-degree-hybrid-couplers/3-db-180-degree-hybrid-couplers-4100400/, retrieved on Jan. 13, 2025, 5 pages.
TAP Microwave, "Hybrid Coupler", Online available at URL: https://www.tapmicrowave.com/category/products/hybrid-coupler/, retrieved on Jan. 13, 2025, 3 pages.
Keysight Technologies, Inc., "87310B Coaxial Hybrid Coupler, 90 Degree, 1 GHz to 18 GHz", Online: https://www.keysight.com/us/en/product/87310B/coaxial-hybrid-coupler-90-degree-1-ghz-18-ghz.html, retrieved on Jan. 13, 2025, 2 pages.
Chi et al., "A Compact Wideband Millimeter-Wave Quadrature Hybrid Coupler Using Artificial Transmission Lines on a Glass Substrate", IEEE Microwave and Wireless Component Letters, vol. 30, No. 11, Nov. 2020, pp. 1037-1040.
Khaira et al., "Cryogenic Wideband Quadrature Hybrid Couplers Implemented in a Low Temperature Superconductor Multilayer Process", Proceedings of the IEEE MTT-S International Microwave Symposium (IMS), 2022, pp. 160-163.
MathWorks "couplerBranchline—Create branch line coupler or quadrature hybrid" since R2021b, updated in R2023b and R2022b, [https://www.mathworks.com/help/rfpcb/ref/couplerbranchline.html] retrieved Jan. 31, 2025, 7 pages.
Singh et al. "Wideband Millimeter-Wave Quadrature Coupler With Constant Bandwidth Scalability" U.S. Appl. No. 18/757,226, filed Jun. 27, 2024, 40 pages.
Singh, et al. "Wideband Hybrid Coupler for Constant Bandwidth Tuning With In-Band and Out-of-Band Radio Frequency Matching" U.S. Appl. No. 18/798,256, filed Aug. 8, 2024, 46 pages.
Singh et al. "Scalable Planar Crossover Coupler With Bandwidth and Coupling Strength Tuning" U.S. Appl. No. 18/798,336, filed Aug. 8, 2024, 39 pages.
Non-Final Office Action received for U.S. Appl. No. 18/757,226 dated Jan. 15, 2026, 14 pages.
Sun et al., "Miniaturised Patch Hybrid Couplers Using Asymmetrically Loaded Cross Slots", IET Microwaves, Antennas & Propagation, vol. 4, Issue No. 9, 2010, pp. 1427-1433.
Li et al., "A Miniaturised Butler Matrix Based on Patch Hybrid Couplers with Cross Slots", IEEE Antennas and Propagation Society International Symposium, 2013, pp. 2145-2146.
Free et al., "RF and Microwave Circuit Design: Theory and Applications", Wiley, 2022, 12 pages.
"The Authoritative Dictionary of IEEE Standards Terms", 7th Edition, IEEE 100, 2000, 5 pages.
Final office action received for U.S. Appl. No. 18/757,226 dated May 12, 2026, 15 pages.
Non-Final office action received for U.S. Appl. No. 18/798,336 dated Mar. 25, 2026, 13 pages.

* cited by examiner

MILLIMETER-WAVE CROSSOVER COUPLER

BACKGROUND

The telecommunications industry is moving towards communications based on higher frequencies to accommodate the soaring demand for bandwidth. For example, beamforming networks have the need for various radio frequency (RF) components, including crossover couplers. Crossover couplers, used in phase-sensitive applications like Butler matrices and antenna feed networks, encounter significant challenges at millimeter-wave (mmWave) frequencies. Traditional designs introduce substantial signal coupling issues, and have problems with maintaining performance over the wider bandwidths needed by mm Wave applications.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
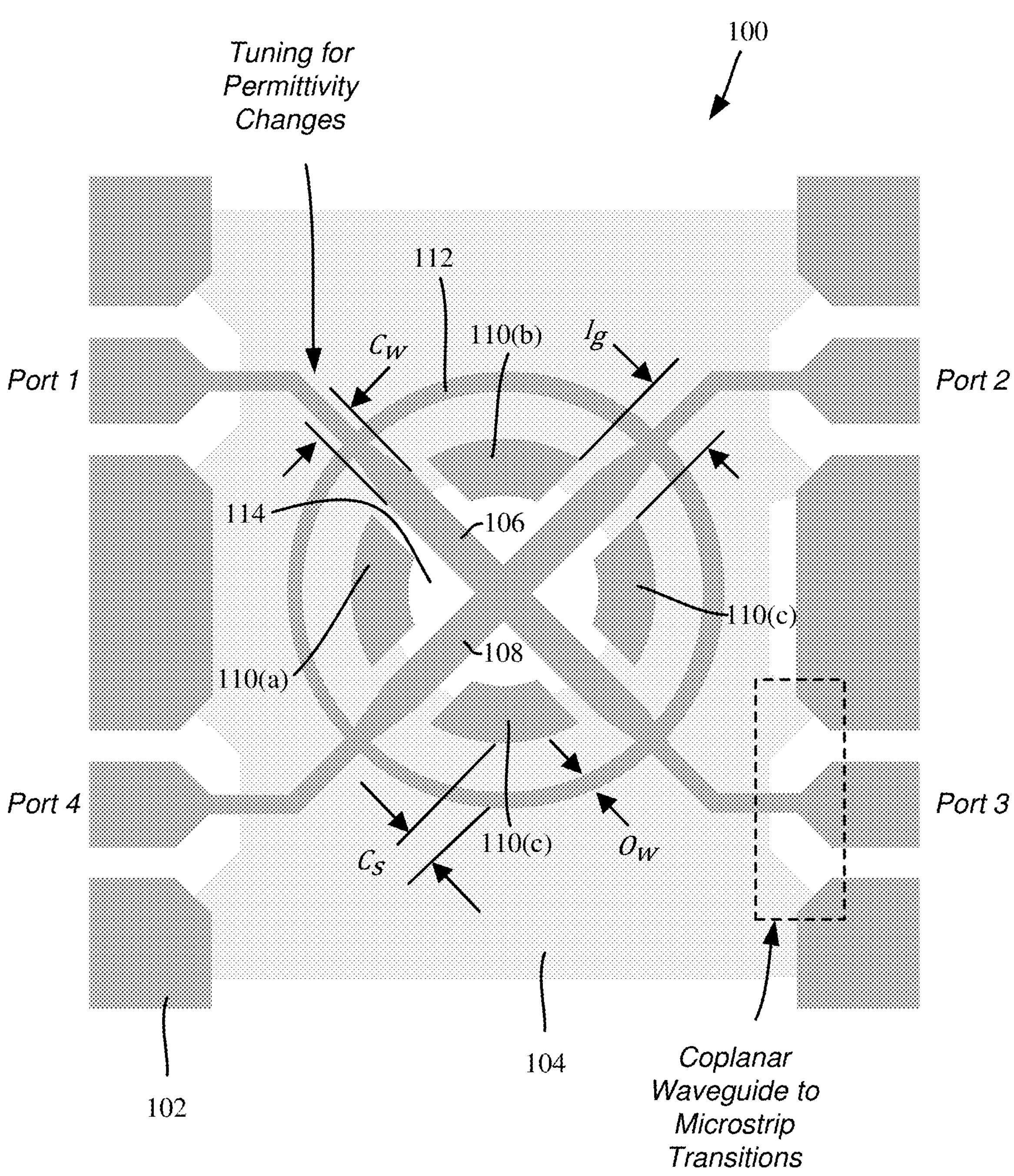
FIG. 1 is top view representation of an example layout of a planar crossover coupler, showing various design dimensions, in accordance with various embodiments and implementations of the subject disclosure.

The technology described herein is generally directed towards a crossover coupler including cross-shaped apertures enclosed by four metallic inner and outer partial patches, which effectively direct the electromagnetic fields to the crossover circuit's ports. The example design helps mitigate the often-encountered issues experienced by conventional models, such as excessive losses and poor E-field and H-field management.

In one implementation, a compact, passive crossover circuit is designed with a single-top-layer metal configuration, eliminating the need for any additional interconnect layers. The example design distinguishes itself from existing market standard and other academic proposals by offering scalability and reduced insertion loss, particularly for millimeter wave (mmWave) applications. The crossover circuit can be engineered for a wide bandwidth, maintaining consistency across its range, which streamlines the process of adjusting the circuit for various frequencies, and thereby bypasses the need for the extensive and time-consuming optimization that is typically required in existing designs, which can take from hours to days. Moreover, the example design described herein is not as sensitive to the minutiae of dimensions as with other crossover circuits, which can translate to lower production costs. By addressing and overcoming traditional issues like scalability, efficiency in field distribution, and the complexity of fine-tuning, this technology described herein provides a practical and cost-effective crossover circuit for mm Wave systems.

For example, in the rapidly advancing field of millimeter-wave technologies, the development of efficient beamforming networks is a significant need. Crossover couplers are valued and needed components in beamforming networks (along with quadrature couplers and antenna elements), as crossover couplers facilitate intersection of signal paths without interference, which is needed for precise beam directionality. Described herein in one example implementation is a passive, interconnect-less planar, compact-sized crossover coupler able to be incorporated into mmWave beamforming networks. The technology described herein provides a scalable design adaptable to various parameters, while also achieving a wideband response, particularly at high frequencies such as the 28 GHz frequency band.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to “one embodiment,” “an embodiment,” “one implementation,” “an implementation,” etc. means that a particular feature, structure, characteristic and/or attribute described in connection with the embodiment/implementation can be included in at least one embodiment/implementation. Thus, the appearances of such a phrase “in one embodiment,” “in an implementation,” etc. in various places throughout this specification are not necessarily all referring to the same embodiment/implementation. Furthermore, the particular features, structures, characteristics and/or attributes may be combined in any suitable manner in one or more embodiments/implementations.

Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 shows a top view of an example wideband crossover coupler 100 designed using a cross-shaped geometry, in which the top metallization layer (e.g., the darker shaded material 102) and the bottom metallization layer (e.g., the lighter shaded material 104) are each fabricated via a single-layer metal configuration on top of (FIGS. 1 and 2) and beneath a substrate 220 (FIG. 3), respectively. In the example wideband crossover coupler 100, two sets of opposite ports (ports 1 and 3, and ports 2 and 4) intersect via crossing, substantially perpendicular microstrip lines 106 and 108, surrounded by four metallic inner partial couplers 110(*a*)-110(*d*) consolidated within a metallic outer ring 112. Each microstrip line can be considered as having two segments, e.g., the microstrip line 106 has one segment coupled to port 1, and the other coupled to port 3. Adjacent pairs of the four metallic inner partial couplers 110(*a*)-110(*d*) are distributed between two adjacent segments of the four segments. The unshaded (e.g., circular) area is a cutout 114 (non-metallic portion) in the bottom metallization layer 104 as described with reference to FIG. 3. Significantly, no interconnecting layer is required, and the example crossover coupler 100 is passive, needing no powered components.

As will be understood, the example design described herein facilitates specifications and material variations that are straightforward to implement with design tweaks. These include, but are not limited to, any change in the substrate permittivity, which can be optimized by changing the $C_w$ variable (width of the middle cross intersection portion). The coupling strength can be optimized by changing the gap dimensions $C_s$ between the inner partial couplers 110(*a*)-110(*d*) and the outer ring 112. The width $O_w$ of the outer ring 112, and the gap $l_g$ between adjacent inner partial couplers 110(*a*)-110(*d*) allow precise bandwidth tuning.

Figure 2:
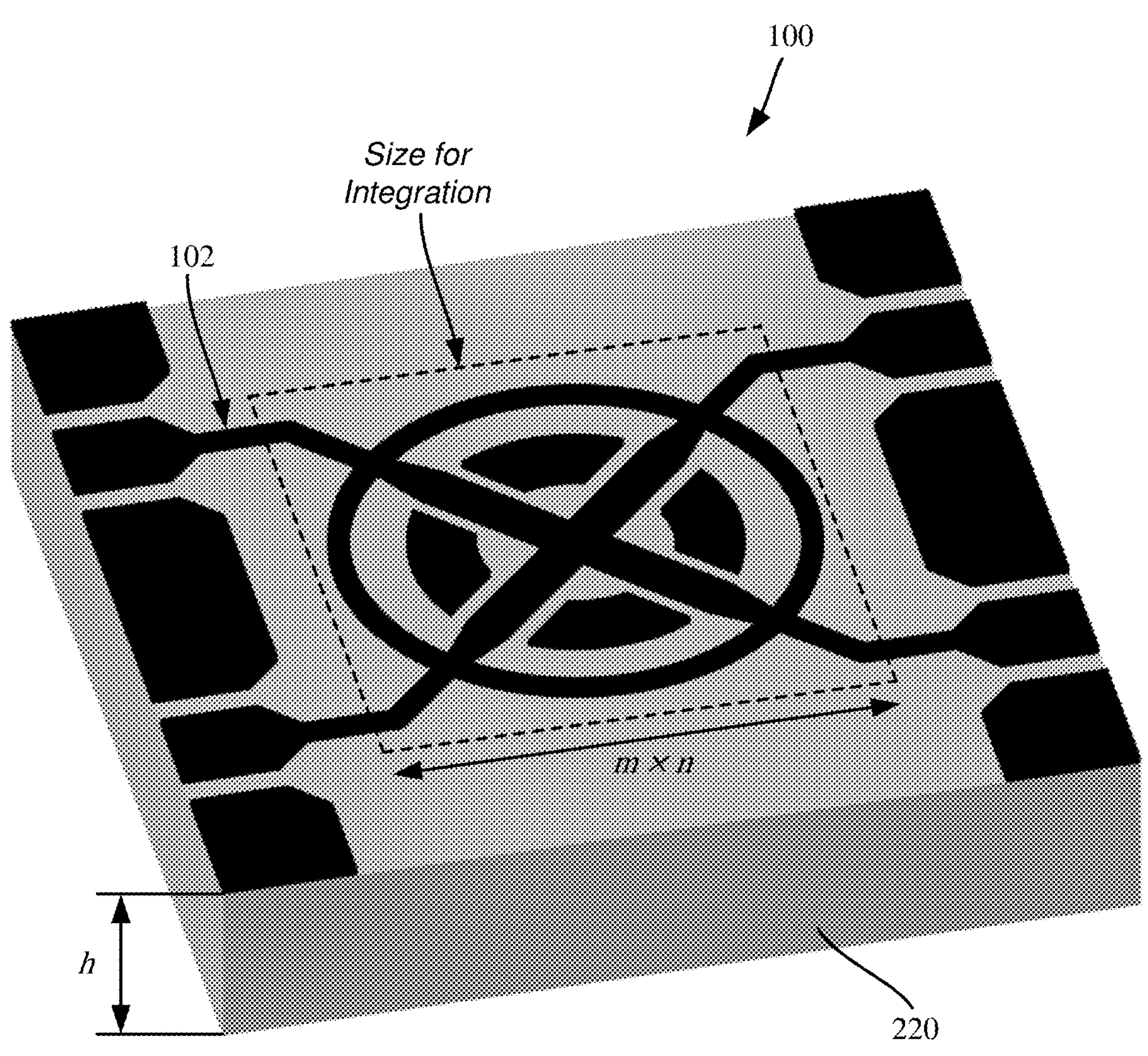
FIG. 2 is a three-dimensional (3D) perspective top view of a model of the crossover coupler corresponding to FIG. 1, in accordance with various embodiments and implementations of the subject disclosure.
Figure 3:
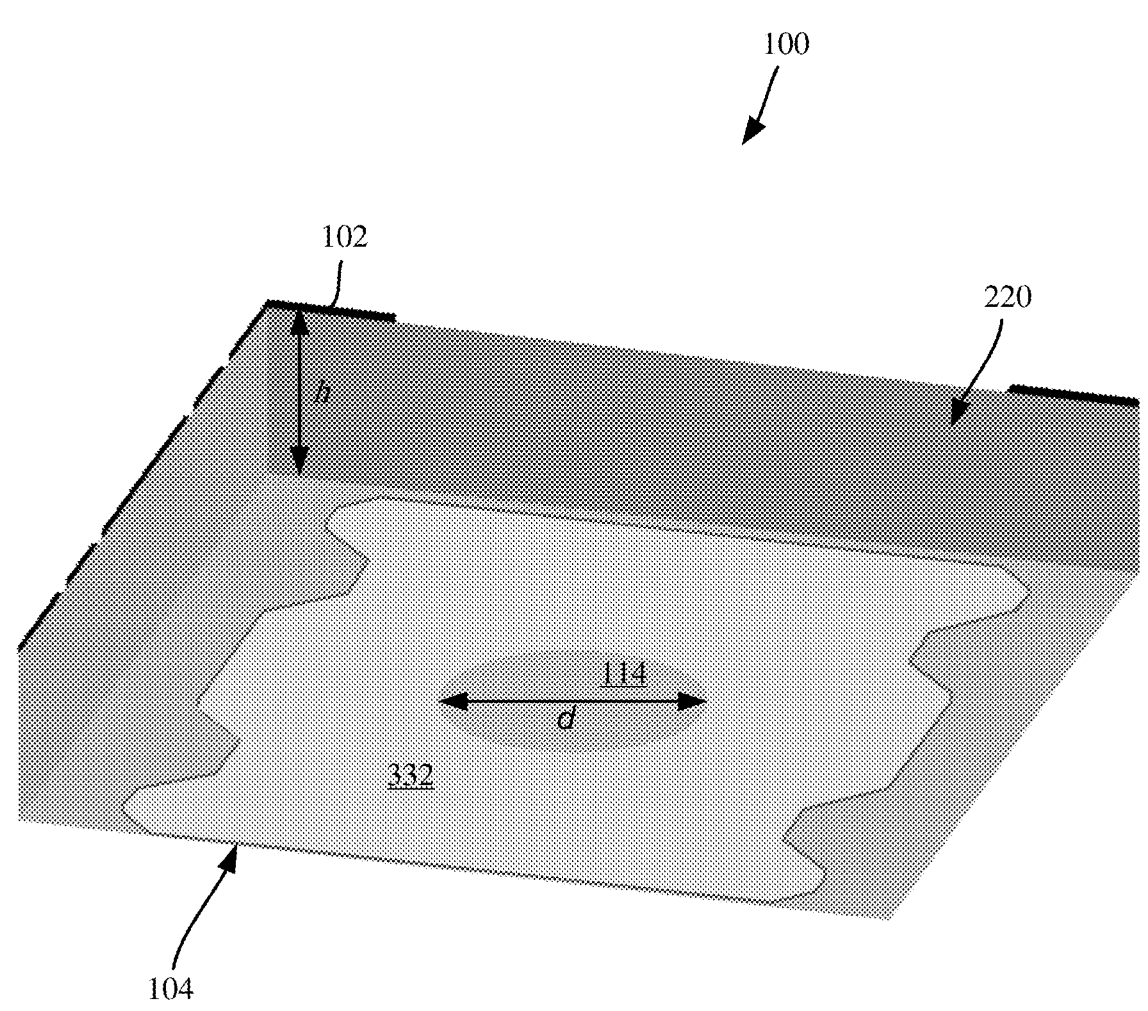
FIG. 3 is a 3D perspective bottom view of the underside of the crossover coupler corresponding to FIGS. 1 and 2, highlighting a cutout in a bottom metallization layer, in accordance with various embodiments and implementations of the subject disclosure.

The three-dimensional top perspective view and bottom perspective views are depicted in FIGS. 2 and 3, respectively. Although, the layout shown in FIGS. 1-3 shows coplanar waveguide-to-microstrip transitions, which allows using the crossover coupler 100 as a standalone interconnect-less device, the overall size of the crossover coupler 100 can be configured for integration with other radio frequency (RF) components, as denoted by the "m×n" dashed line in FIG. 2.

As shown in FIG. 3, the bottom metallic plane 332 fabricated as part of the bottom metallization layer 104 has the (e.g., circular) cutout 114 of diameter d, (through which part of the bottom of the substrate 220 can be seen in FIG. 3), allowing designers to mitigate any RF mismatch, e.g., via intentional EM fields' discontinuity underside the crossover core. The diameter d of the cutout 114 in the bottom metallization plane 332 (FIG. 3) can also be tweaked for any change in the substrate height, h. The bottom metallic plane 332 and/or the cutout 110 are not limited to any particular shape, and indeed, the bottom metallic plane 332 can span the entire length and/or width of the bottom of the substrate 220, minus any portion for the cutout 114.

In one example implementation, the length and width of the ports (ports 1-4 in FIG. 1) are chosen to have a characteristic impedance $Z_0$ of 50Ω, but can be varied to accommodate any other impedance (such as if the wideband crossover coupler 100 is used right after an antenna). Specific dimensions are not provided, as this design is scalable, whereby the designer only needs to scale the size of the overall structure (m×n) to change the center frequency while still keeping the same bandwidth, e.g., based on the width $O_w$ of the outer ring 112 and/or the gap $l_g$ between adjacent pairs of the inner partial couplers 110(*a*)-110(*d*).

Note that the single top metallization layer crossover circuit design described herein is in contrast to a typical crossover circuit, including those in which the dimensions of such a typical device are decided by the λ/4 length of microstrip lines. While such existing implementation approaches are straightforward, the typical approach presents a significant limitation regarding bandwidth, because the line lengths achieve λ/4 only at a specific frequency. Such typical crossover couplers are adequate in low-frequency applications, including cellular phones, where a narrow bandwidth of a few MHz suffices. A typical crossover circuit in a beamforming network with current planar RF crossovers has a large physical size, which is a significant drawback.

As frequencies increase, the wavelength decreases, necessitating smaller components to maintain performance; however, traditional crossover couplers designs are constrained by the quarter-wavelength (λ/4) line lengths used to create the necessary phase shifts, leading to a limited operational bandwidth and substantial circuit sizes. This limits the miniaturization potential, which is highly significant for modern, compact electronic devices that need dense integration of RF components. Moreover, the large footprint of these crossovers means that they consume more valuable space on the RF circuit board, which is problematic for applications that require a large number of crossovers, such as phased array systems. More compact traditional designs are thus based on a two-layer approach or a double-circuit board approach, each of which lead to large parasitic capacitance, which limits the coupling ratio further.

Additionally, at higher frequencies, the losses associated with larger RF components become more pronounced, and the precise fabrication required for smaller wavelengths can drive up costs, making these solutions both bulky and expensive. Commercially available planar RF crossovers are not fully integrated solutions, which means they often require additional external components to function within a system, further increasing the complexity and size of the overall design. This lack of integration is particularly disadvantageous for mmWave systems, where space, performance, and cost are premium concerns.

In sum, the challenges of traditional crossover couplers encompass narrow operational bandwidth, increased insertion loss, poor isolation, and compromised phase and amplitude balance, undermining the efficiency and reliability of high-frequency wireless systems. Moreover, at mmWave frequencies, the physical and electrical limitations inherent to crossover couplers restrict their utility. For mmWave frequency applications, crossover couplers need to integrate seamlessly with planar technologies and achieve miniaturization, while also ensuring high performance across a broad frequency spectrum. The significant issue with a traditional crossover coupler remains the bandwidth constraints exacerbated by mm Wave frequencies, where smaller wavelengths amplify the effects of parasites, material flaws, and fabrication variances. This not only impedes the advancement of mm Wave technology but also constrains the scalability and adaptability of communication systems.

The compact crossover coupler 100 described herein is thus highly appropriate for mm Wave systems and technologies such as 5G and beyond; the compact design reduces material and manufacturing costs, while enabling the creation of more sophisticated, higher-density array architectures that are needed for the high-speed, high-capacity demands of future wireless communication systems.

Figure 4:
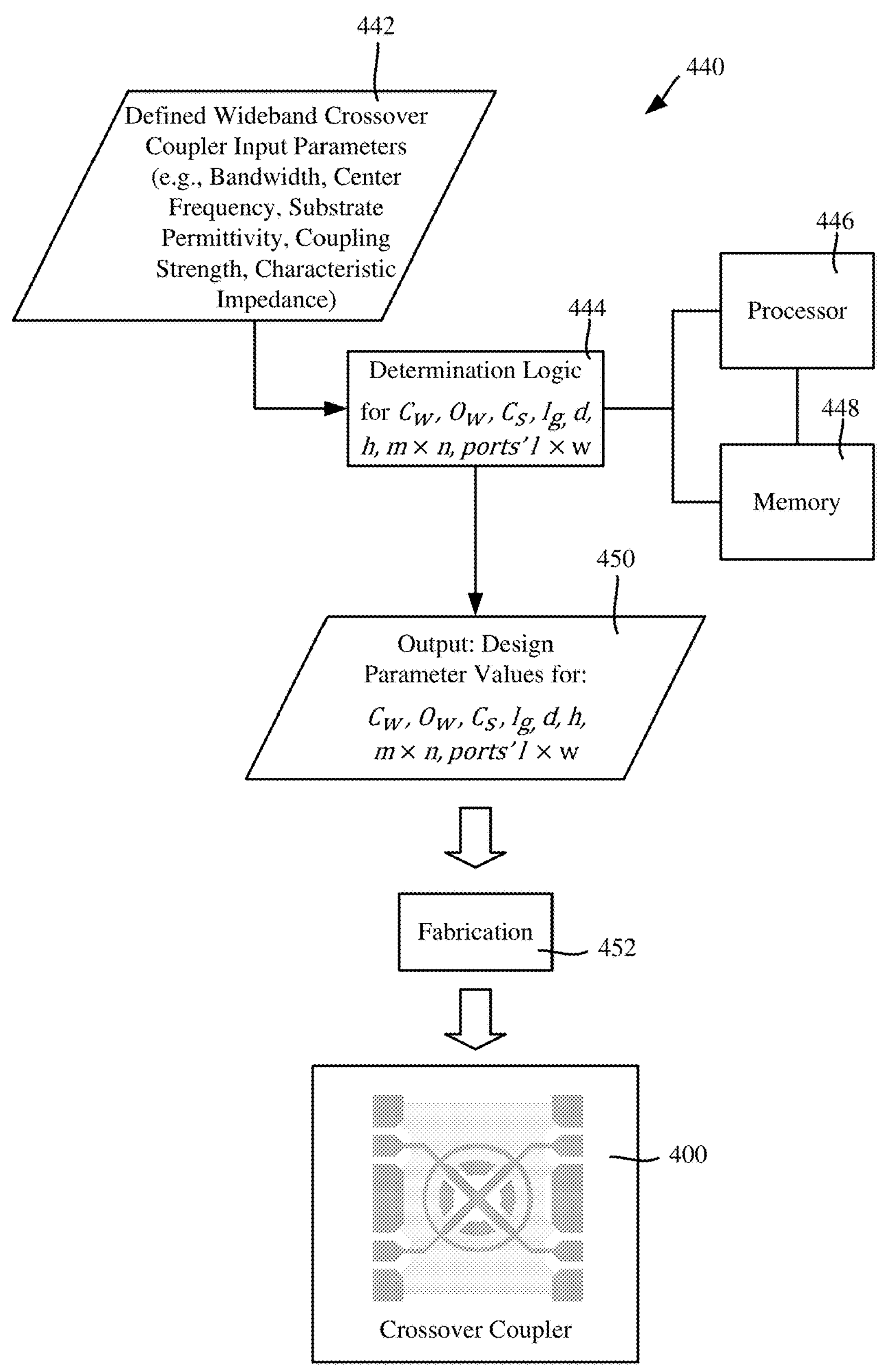
FIG. 4 is a block diagram showing an example system for determining design parameters for a millimeter-wave crossover coupler, in accordance with various embodiments and implementations of the subject disclosure.

FIG. 4 shows a generalized block diagram of an example system 440 for designing a compact, single layer wideband crossover coupler 400 based on defined needs of an application, represented by input parameters 442, including, but not limited to the desired bandwidth, center frequency, substrate permittivity, coupling strength and characteristic impedance $Z_0$. Determination logic 444, e.g., executed via at least one processor 446 and memory 448, can determine the output design parameter values 450 for the dimensions and other factors for a wideband crossover coupler 400 that achieves these input parameters 442. These include the substrate permittivity (established/optimized by changing the $C_w$ width of the middle cross intersection portion), and the coupling strength (established/optimized by changing the gap dimensions $C_s$ between the inner partial couplers and the outer ring 108). The width $O_w$ of the outer ring and the gap $l_g$ between adjacent inner partial couplers facilitate precise bandwidth tuning. The substrate height h and cutout diameter d can be determined based on needing to mitigate RF mismatch. Also, the overall m×n scaling size of the crossover coupler and the ports' length and width (l×w) values (to meet the desired characteristic impedance $Z_0$) can be determined as part of the output design parameter values 450.

Based on these output design parameter values 450, fabrication (represented by block 452) can be performed in a straightforward manner by any suitable technique that fabricates the single top metallization layer on the (height h) substrate, and fabricates the bottom metallization layer with the appropriately-sized cutout beneath the substrate. The result is a compact, relatively low-cost crossover coupler 400 as described herein that provides significant benefits in high-frequency (e.g., mmWave) applications.

To simulate in a 3D field solver (e.g., Ansys HFSS), the design of FIGS. 2 and 3 was used, in which the ports were defined as lumped ports, chosen with 50Ω characteristic impedance and 30 dBm of input RF power injected in the port 1. A scalable radiation box was designed to accommodate the study of E- and H-field. For this design, a standard Rogers 4000 series substrate was chosen, but for different substrate materials such as FR4 laminates, alumina, silicon, glass, or any other dielectric material, the crossover coupler can be optimized by only varying the design parameters as described herein to keep consistent RF performance. Design parameters can be parametrized to achieve desired performance for a specific dielectric constant and loss tangent.

Figure 5:
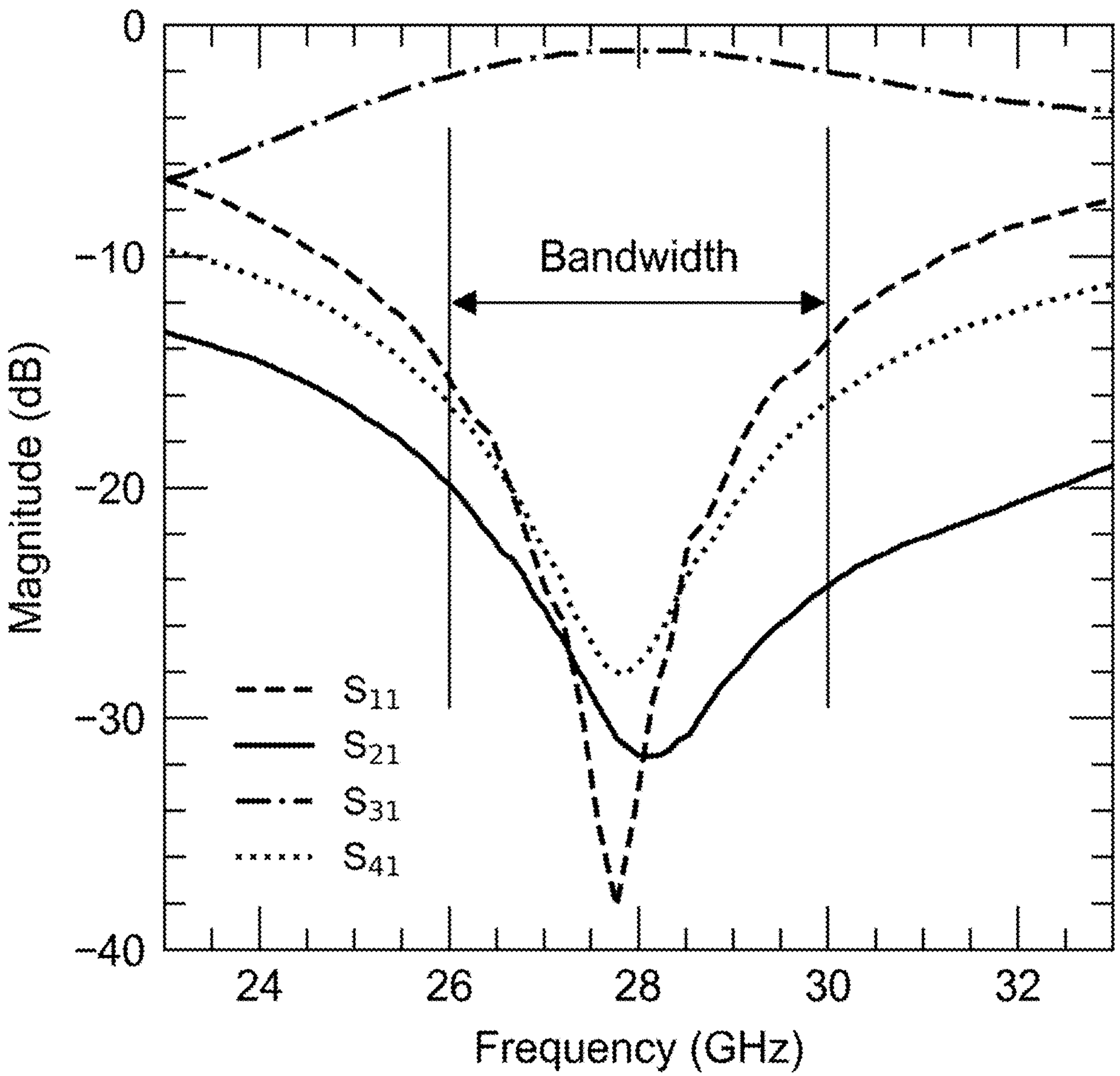
FIG. 5 is a graphical representation of a simulation response of the example crossover coupler designed with a 4 GHz bandwidth and a 28 GHz center frequency, in accordance with various example embodiments and implementations of the subject disclosure.

As can be seen in FIG. 5, for a center frequency around 28 GHZ, a wide 4 GHz band was achieved with respect to the various S-parameters via the example design, that is, the EM simulation response of the crossover coupler shows a fully matched wideband signal crossover with minimum transmission loss, demonstrating excellent RF performance over the desired 4 GHz bandwidth and 28 GHz center frequency. A low crossover insertion loss can be seen from $S_{31}$, which is the signal flowing from port 1 to 3 (crossover). The $S_1$, $S_{21}$, and $S_{41}$, are below −15 dB over the band, iterating less than three percent of reflections and/or more than ninety-seven percent of isolation. Indeed, with this example design, the isolation is better than 25 dB over the band, in contrast to commercially available couplers, which have isolation of 13-15 dB. In the example design described herein, the loss of the crossover is lower than 0.7 dB over the entire band. In sum, the example design, which is straightforward to implement and tweak, is thus highly suitable for wide bandwidth and high frequency applications.

Turning to some use case examples for crossover couplers, in densely packed integrated circuits or printed circuit boards (PCBs), crossover couplers enable the crossing of signal paths without physical contact, significantly reducing signal crosstalk and electromagnetic interference (EMI). This maintains signal integrity in high-speed digital and RF circuits.

The compact crossover coupler described herein allows for more compact and efficient PCB layouts by reducing the need for additional layers and/or complex routing strategies that are typically required to manage signal paths in high-density designs. In high-speed computing and digital systems, crossover couplers facilitate the management of data buses, ensuring that high-speed signals can traverse the system without undue interference or loss of integrity.

The compact crossover coupler described herein can play a significant role in preserving signal integrity by providing a direct path for signal crossover, thereby minimizing latency and potential distortion in high-speed digital transmissions.

RF and microwave systems include antenna feeding networks, in which (similar to their quadrature counterparts) crossover couplers can be used in antenna systems for simplifying the feeding network design by efficiently managing signal paths within the system. With respect to frequency multiplexing/demultiplexing, in RF systems, crossover couplers can be utilized to implement frequency multiplexing and demultiplexing with minimal loss and interference, enabling the simultaneous transmission and reception of multiple frequency bands over the same physical medium.

Crossover couplers can be used in electronic test and measurement setups to sample signals without disturbing the primary signal path, similar to their application in directional coupling, but optimized for settings where space and interference are concerns.

With respect to mm Wave crossover coupler uses, in mmWave communication systems, including 5G and beyond, crossover couplers based on the example design described herein enable dynamic beam steering by facilitating precise phase adjustments across antenna elements. This is used for targeting signals towards specific users and moving objects, thereby optimizing coverage and connectivity. Crossover couplers allow for the manipulation of beam shapes to maximize signal strength and minimize interference with neighboring beams, which is particularly valuable in dense urban environments where the risk of signal interference is high. By enabling signal paths to cross without interference, compact mmWave crossover couplers contribute to more compact and integrated antenna array designs, which is valuable in applications where space is at a premium, such as in mobile devices and small-cell base stations.

Figure 6:
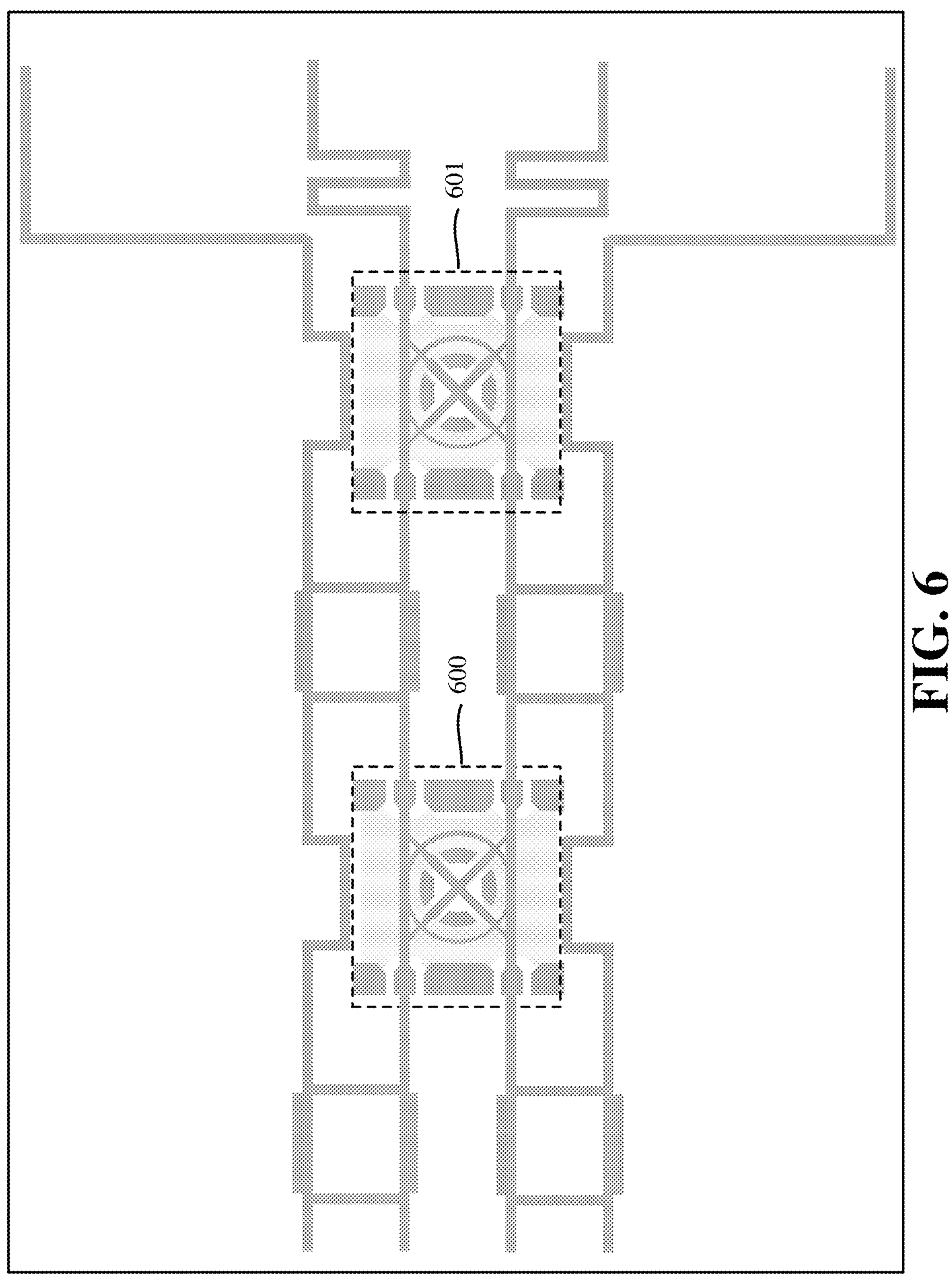
FIG. 6 is a representation of a schematic of a Butler matrix beamforming network, including the example crossover coupler as described herein, in accordance with various example embodiments and implementations of the subject disclosure.
Figure 7:
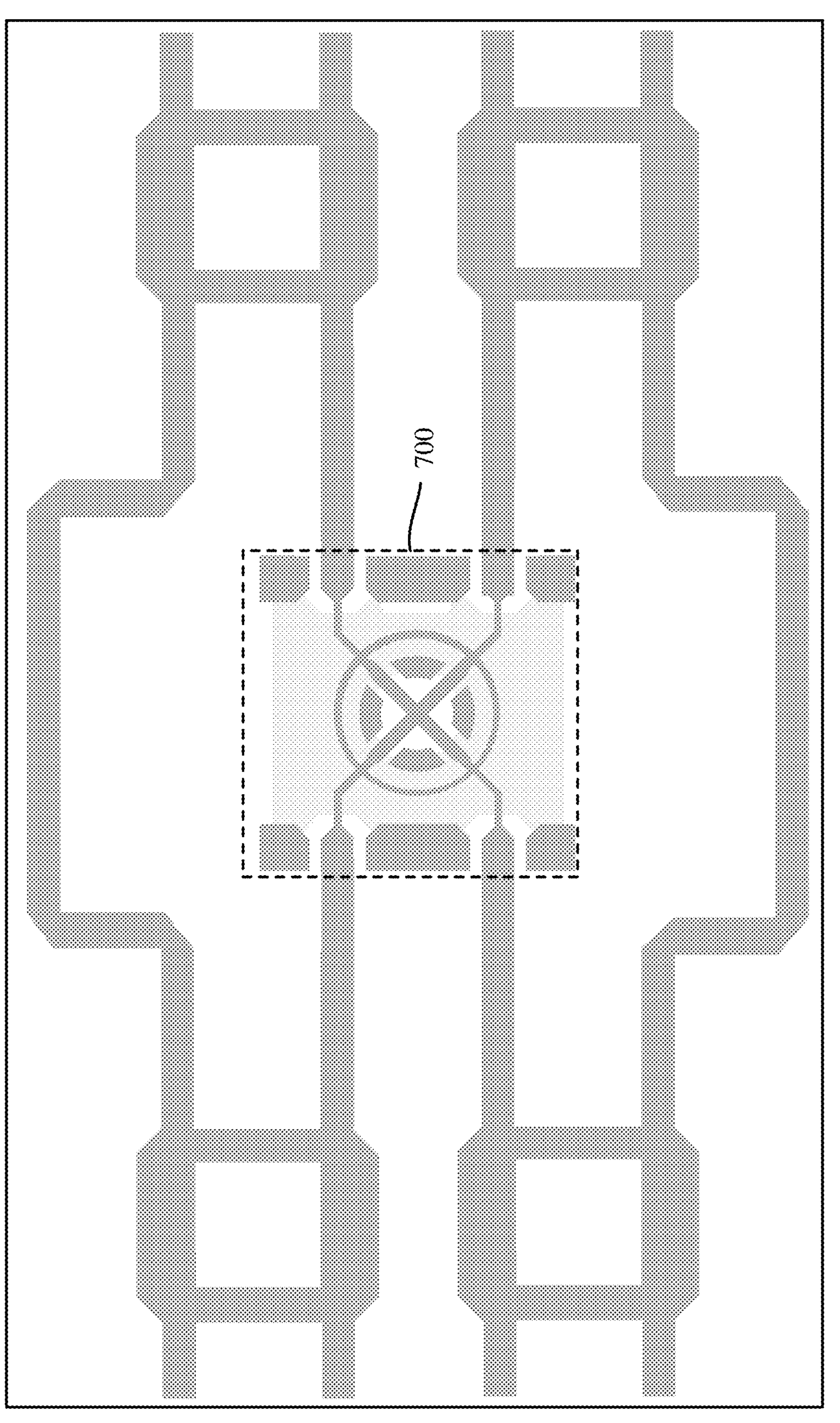
FIG. 7 is a representation of a schematic of a Butler matrix beamforming network, including the example crossover coupler as described herein in the middle, in accordance with various example embodiments and implementations of the subject disclosure.
Figure 8:
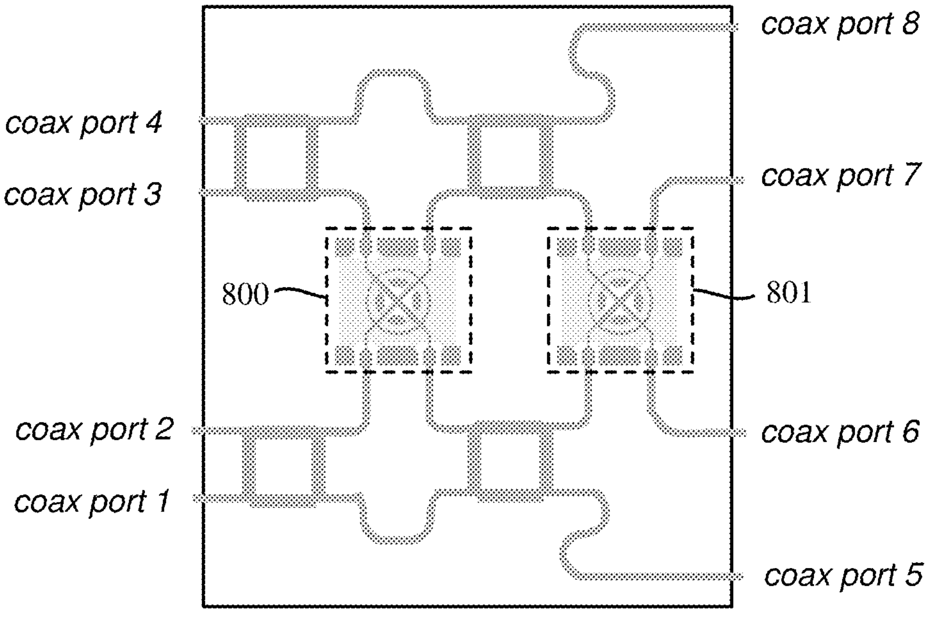
FIG. 8 is a representation of a schematic of a fabricated four-port Butler matrix network including two example crossover couplers as described herein, in accordance with various example embodiments and implementations of the subject disclosure.

Crossover couplers designed for mmWave frequencies as described herein are optimized to minimize insertion loss (reduce signal loss), ensuring that the power of the transmitted and received signals is preserved. This is valuable for maintaining the efficiency of the beamforming network, especially over the wide bandwidths exploited by mm Wave technologies. FIG. 6 shows crossover couplers 600 and 601 as described herein incorporated into a Butler matrix beamforming network. FIG. 7 shows a crossover coupler 700 as described herein incorporated into a four-port Butler matrix with the crossover in the middle. FIG. 8 shows a four-port Butler matrix network fabricated with two crossover couplers 800 and 801 as described herein.

In MIMO (multiple input, multiple output) systems, which are integral to achieving high data rates and reliable connections in wireless communication, mmWave crossover couplers as described herein facilitate the routing of signals between multiple antennas and processing units. This enhances the system's ability to handle multiple simultaneous data streams, improving throughput and reducing latency.

For systems employing spatial multiplexing techniques, crossover couplers as described herein enable the separation and combination of multiple data streams in a spatial domain, thus increasing the capacity of the communication system without requiring additional bandwidth. Crossover couplers as described herein help in managing and mitigating interference within the beamforming network, ensuring stable and reliable communication even in the presence of obstacles or competing signals. Crossover couplers as described herein support the implementation of adaptive antenna systems that can reconfigure (facilitate adaptive network configurations) in real-time based on environmental conditions and user demands, thereby enhancing network performance and user experience.

One or more example embodiments can be embodied in a crossover coupler, such as described and represented herein. The crossover coupler can include a top metallization layer, which can include a first port, a second port, a third port, and a fourth port. The first port can be coupled to a first segment of a first microstrip line, and the third port can be coupled to a third segment of the first microstrip line; the second port can be coupled to a second segment of a second microstrip line and the fourth port can be coupled to a fourth segment of the second microstrip line. The first microstrip line and the second microstrip line can cross at an intersection point in a cross-shaped pattern. The top metallization layer further can include inner partial couplers surrounding the intersection point, which can include a first inner partial coupler between the first segment and the fourth segment, a second inner partial coupler between the first segment and the second segment, a third inner partial coupler between the second segment and the third segment, and a fourth inner partial coupler between the third segment and the fourth segment, and an outer ring surrounding the inner partial couplers. The crossover coupler further can include a bottom metallization layer, which can include a ground plane, and a substrate between the top metallization layer and the bottom metallization layer. The dimensions of the crossover coupler can determine radio frequency characteristics of the crossover coupler, in which the radio frequency characteristics can include a defined bandwidth around a center frequency.

The bottom metallization layer can include a defined-size cutout area. The defined-size cutout area can be determined by a height of the substrate.

The width of the first microstrip line proximate to the intersection point can be based on a permittivity of the substrate.

The coupling strength of the crossover coupler can be determined by a gap distance between the first inner partial coupler and the outer ring.

A width of the outer ring can, at least in part, determine the defined bandwidth.

A gap distance between the first inner partial coupler and the second inner partial coupler can, at least in part, determine the defined bandwidth.

A defined size of an area encompassing the outer ring can determine the center frequency.

Respective length and width dimensions of the first port, second port, third port and fourth port can determine a characteristic impedance of the crossover coupler.

The top metallization layer and the bottom metallization layer can form a coplanar waveguide without an interconnecting layer between the top metallization layer and the bottom metallization layer.

The defined bandwidth can be greater than around three gigahertz at a center frequency that can be greater than around fifteen gigahertz.

The inner partial couplers can be substantially identical in size and symmetrically distributed at substantially identical distances from the intersection point, and at substantially identical distances from the outer ring.

One or more example embodiments can be embodied in a device, such as described and represented herein. The device can include a crossover coupler, which can include a single top metallization layer, a substrate beneath the single top metallization layer, and a single ground plane metallization layer beneath the substrate. The single top metallization layer can include a first pair of opposite ports coupled together by a first microstrip line, a second pair of opposite ports coupled together by a second microstrip line, wherein the first microstrip line and the a second microstrip line form a cross-shaped pattern that intersects at an intersection point, inner partial couplers substantially symmetrically or symmetrically distributed around the intersection point, and an outer ring that surrounds the inner partial couplers and is substantially centered at the intersection point.

The crossover coupler can be incorporated into a beamforming network.

A defined size of an area encompassing the outer ring can determine a defined center frequency of the crossover coupler, and at least one of: a width of the outer ring, or respective gap distances between respective adjacent pairs of the inner partial couplers, can determine a defined bandwidth of the crossover coupler.

A defined gap distance between the inner partial couplers and the outer ring can determine the coupling strength of the crossover coupler.

Figure 9:
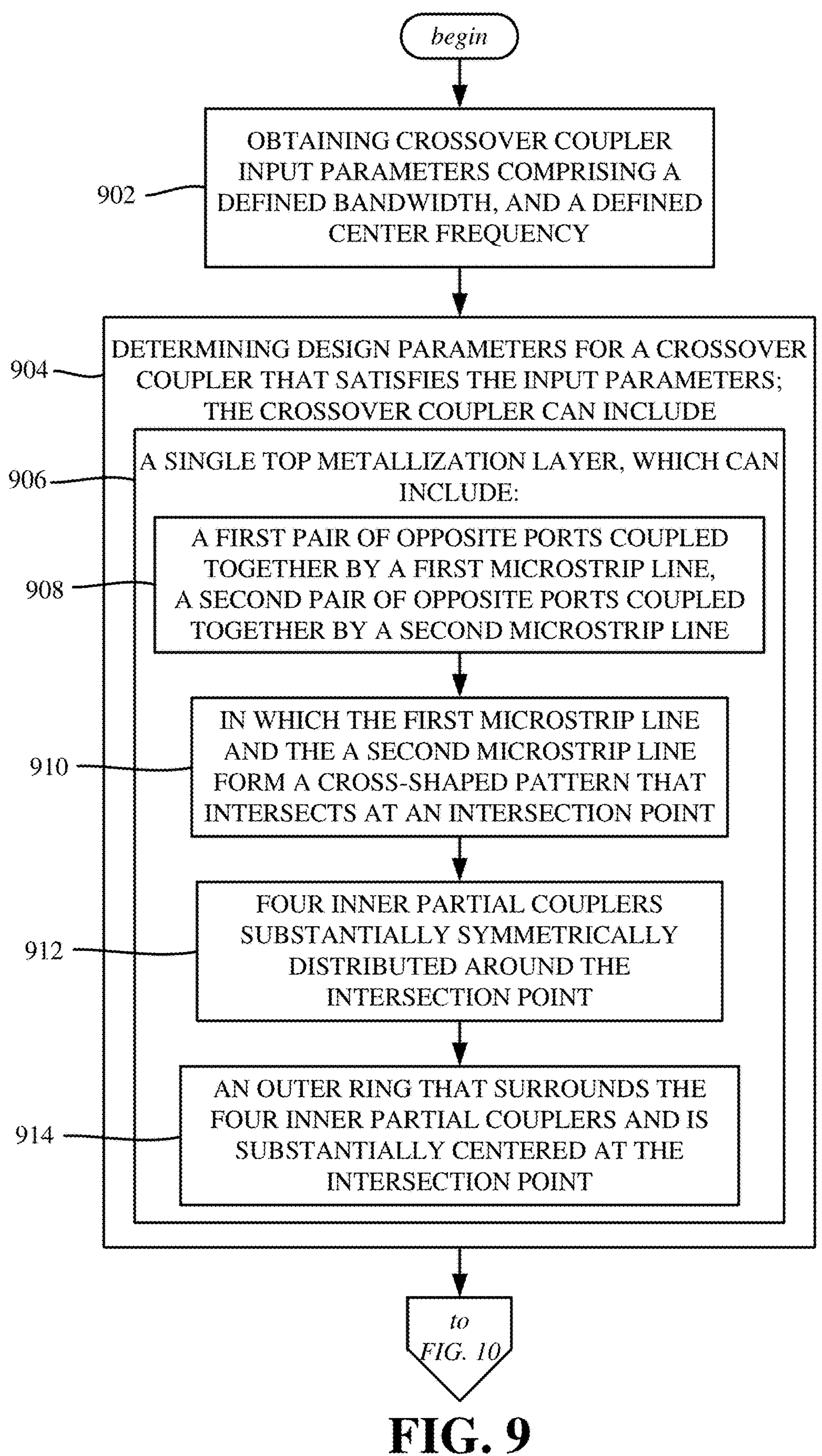
FIGS. 9 and 10 comprise a flow diagram showing example operations related to determining design parameters for a crossover coupler based on input parameters, and configuring the crossover coupler to be implemented based on the design parameters, in accordance with various example embodiments and implementations of the subject disclosure.
Figure 10:
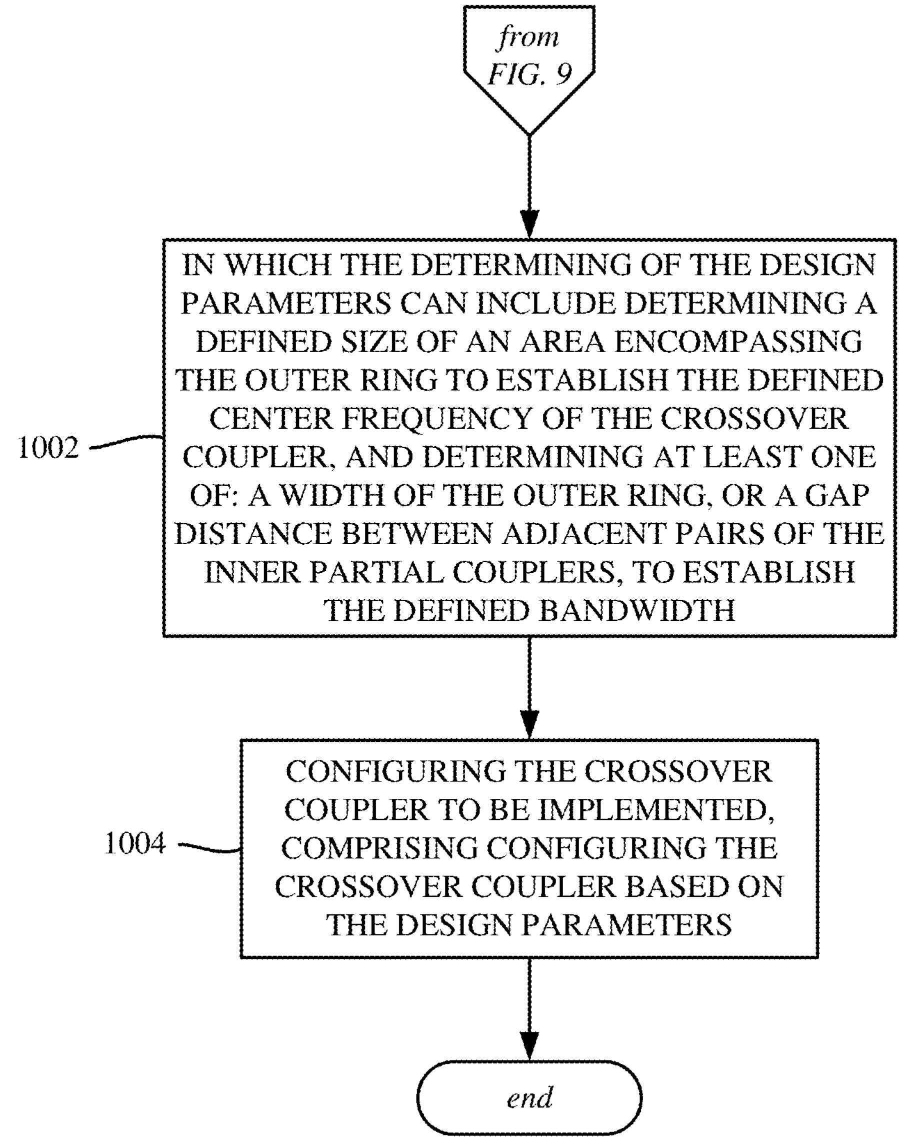

FIGS. 9 and 10 summarize various example operations, e.g., corresponding to a method, a computer-implemented system, and/or a machine-readable medium, including executable instructions that, when executed by a processor, that, when executed by at least one processor, facilitate performance of operations. Example operation 902 represents obtaining crossover coupler input parameters comprising a defined bandwidth, and a defined center frequency. Example operation 904 represents determining design parameters for a crossover coupler that satisfies the input parameters. The crossover coupler can include a single top metallization layer (block 906), which can include a first pair of opposite ports coupled together by a first microstrip line (block 908), a second pair of opposite ports coupled together by a second microstrip line, in which the first microstrip line and the a second microstrip line form a cross-shaped pattern that intersects at an intersection point (block 910), four inner partial couplers substantially symmetrically distributed around the intersection point (block 912), and an outer ring that surrounds the four inner partial couplers and is substantially centered at the intersection point (block 914). The operations continue at example operation 1002 of FIG. 10, in which the determining of the design parameters can include determining a defined size of an arca encompassing the outer ring to establish the defined center frequency of the crossover coupler, and determining at least one of: a width of the outer ring, or a gap distance between adjacent pairs of the inner partial couplers, to establish the defined bandwidth. Example operation 1004 represents configuring the crossover coupler to be implemented, comprising configuring the crossover coupler based on the design parameters.

Obtaining the crossover coupler input parameters can include obtaining a coupling strength, and the determining the design parameters further can include determining a gap distance between the partial couplers and the outer ring to establish the coupling strength of the crossover coupler.

Obtaining the crossover coupler input parameters can include obtaining a characteristic impedance, and the determining the design parameters further can include determining length and width dimensions of the first pair of opposite ports and length and width dimensions of the second pair of opposite ports the to establish the characteristic impedance of the crossover coupler.

Obtaining the crossover coupler input parameters can include obtaining substrate permittivity data of a substrate beneath the single top metallization layer, and determining the design parameters further can include determining a width of the first microstrip line proximate to the intersection point based on the substrate permittivity data.

As can be seen, the technology described herein is directed to a crossover coupler, including one implementation that uses a single top metallization layer, is passive, and does not require any interconnecting layer. The design is fully scalable, having low insertion loss at millimeter-wave frequencies, which in part is achieved using intentional EM fields discontinuity underneath the crossover core. The crossover coupler described herein can be optimized for permittivity changes, coupling strength changes, and/or bandwidth tuning using basic design tweaks to facilitate efficient design for subsequent implementation. The general, example design described herein significantly enhances the performance of mmWave systems, offering a significant advancement in the development of next-generation communication technologies.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A crossover coupler, comprising:

a top metallization layer, comprising:

a first port, a second port, a third port, and a fourth port, wherein the first port is coupled to a first segment of a first microstrip line and the third port is coupled to a third segment of the first microstrip line, and wherein the second port is coupled to a second segment of a second microstrip line and the fourth port is coupled to a fourth segment of the second microstrip line, and wherein the first microstrip line and the second microstrip line cross at an intersection point in a cross-shaped pattern, inner partial couplers surrounding the intersection point, comprising a first inner partial coupler between the first segment and the fourth segment, a second inner partial coupler between the first segment and the second segment, a third inner partial coupler between the second segment and the third segment, and a fourth inner partial coupler between the third segment and the fourth segment, and an outer ring surrounding the inner partial couplers;

a bottom metallization layer comprising a ground plane; and a substrate between the top metallization layer and the bottom metallization layer, wherein the dimensions of the crossover coupler determine radio frequency characteristics of the crossover coupler, the radio frequency characteristics comprising a defined bandwidth around a center frequency.

2. The crossover coupler of claim 1, wherein the bottom metallization layer comprises a defined-size cutout area.

3. The crossover coupler of claim 1, wherein the defined-size cutout area is determined by a height of the substrate.

4. The crossover coupler of claim 1, wherein a width of the first microstrip line proximate to the intersection point is based on a permittivity of the substrate.

5. The crossover coupler of claim 1, wherein a coupling strength of the crossover coupler is determined by a gap distance between the first inner partial coupler and the outer ring.

6. The crossover coupler of claim 1, wherein a width of the outer ring determines, at least in part, the defined bandwidth.

7. The crossover coupler of claim 1, wherein a gap distance between the first inner partial coupler and the second inner partial coupler determines, at least in part, the defined bandwidth.

8. The crossover coupler of claim 1, wherein a defined size of an area encompassing the outer ring determines the center frequency.

9. The crossover coupler of claim 1, wherein respective length and width dimensions of the first port, second port, third port and fourth port determine a characteristic impedance of the crossover coupler.

10. The crossover coupler of claim 1, wherein the top metallization layer and the bottom metallization layer form a coplanar waveguide without an interconnecting layer between the top metallization layer and the bottom metallization layer.

11. The crossover coupler of claim 1, wherein the defined bandwidth is greater than around three gigahertz at a center frequency greater than around fifteen gigahertz.

12. The crossover coupler of claim 1, wherein the inner partial couplers are substantially identical in size and symmetrically distributed at substantially identical distances from the intersection point, and at substantially identical distances from the outer ring.

13. A device, comprising:

a crossover coupler, comprising:

a single top metallization layer, a substrate beneath the single top metallization layer, and a single ground plane metallization layer beneath the substrate, wherein the single top metallization layer comprises:

a first pair of opposite ports coupled together by a first microstrip line, a second pair of opposite ports coupled together by a second microstrip line, wherein the first microstrip line and the second microstrip line form a cross-shape pattern that intersects at an intersection point, inner partial couplers substantially symmetrically or symmetrically distributed around the intersection point, and an outer ring that surrounds the inner partial couplers and is substantially centered at the intersection point.

14. The device of claim 13, wherein the crossover coupler is incorporated into a beamforming network.

15. The device of claim 13, wherein a defined size of an area encompassing the outer ring determines a defined center frequency of the crossover coupler, and at least one: of a width of the outer ring, or respective gap distances between respective adjacent pairs of the inner partial couplers, determines a defined bandwidth of the crossover coupler.

16. The device of claim 13, wherein a defined gap distance between the inner partial couplers and the outer ring determines a coupling strength of the crossover coupler.

17. A non-transitory machine-readable medium, comprising executable instructions that, when executed by at least one processor, facilitate performance of operations, the operations comprising:

obtaining crossover coupler input parameters comprising a defined bandwidth, and a defined center frequency;

determining design parameters for a crossover coupler that satisfies the input parameters, the crossover coupler comprising:

a single top metallization layer, comprising:

a first pair of opposite ports coupled together by a first microstrip line, a second pair of opposite ports coupled together by a second microstrip line, wherein the first microstrip line and the second microstrip line form a cross-shaped pattern that intersects at an intersection point, four inner partial couplers substantially symmetrically distributed around the intersection point, and an outer ring that surrounds the four inner partial couplers and is substantially centered at the intersection point, wherein the determining of the design parameters comprises determining a defined size of an area encompassing the outer ring to establish the defined center frequency of the crossover coupler, and determining at least one of: a width of the outer ring, or a gap distance between adjacent pairs of the inner partial couplers, to establish the defined bandwidth; and configuring the crossover coupler to be implemented, comprising configuring the crossover coupler based on the design parameters.

18. The non-transitory machine-readable medium of claim 17, wherein the obtaining of the crossover coupler input parameters comprises obtaining a coupling strength, and wherein the determining of the design parameters further comprises determining a gap distance between the partial couplers and the outer ring to establish the coupling strength of the crossover coupler.

19. The non-transitory machine-readable medium of claim 17, wherein the obtaining of the crossover coupler input parameters comprises obtaining a characteristic impedance, and wherein the determining of the design parameters further comprises determining length and width dimensions of the first pair of opposite ports and length and width dimensions of the second pair of opposite ports the to establish the characteristic impedance of the crossover coupler.

20. The non-transitory machine-readable medium of claim 17, wherein the obtaining of the crossover coupler input parameters comprises obtaining substrate permittivity data of a substrate beneath the single top metallization layer, and wherein the determining of the design parameters further comprises determining a width of the first microstrip line proximate to the intersection point based on the substrate permittivity data.

* * * * *